June 17, 1958  J. M. MILLS  2,839,668
CAMERA PHOTOGRAPHIC FLASHLIGHT ATTACHMENT
Filed Nov. 14, 1955
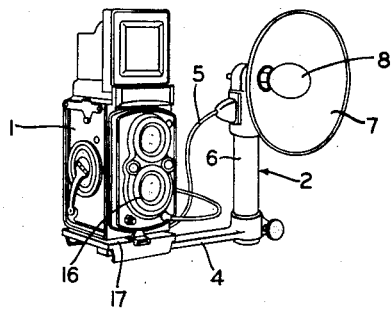
Fig.1
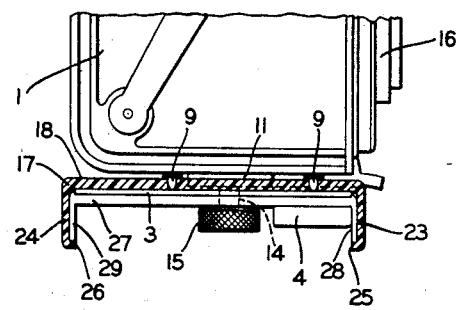
Fig.2
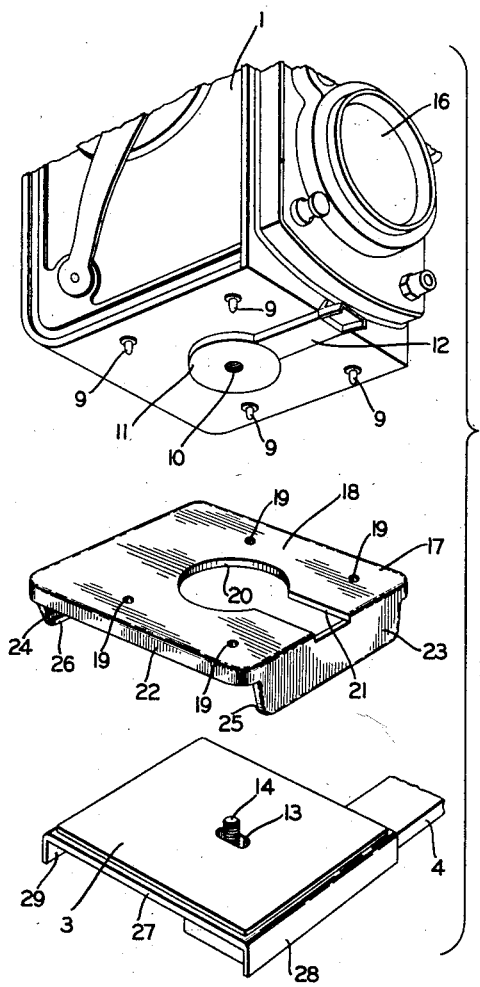
Fig.5
Fig.4
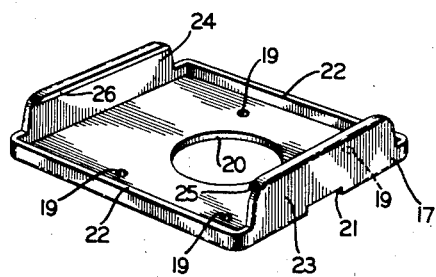
Fig.3
INVENTOR.
James M. Mills
BY Frease & Bishop
ATTORNEYS

2,839,668

CAMERA PHOTOGRAPHIC FLASHLIGHT ATTACHMENT

James M. Mills, Canton, Ohio

Application November 14, 1955, Serial No. 546,321

3 Claims. (Cl. 240—1.3)

This invention relates to means for aligning a camera and photographic flashlight attached thereto.

Most cameras in current use are provided with photographic flashlight attachments. On some cameras, the flashlight is attached directly to the camera. On other cameras the flashlight is attached by means of a spacing bracket. In either event, it is necessary that the camera and the flashlight be properly aligned to cover the same area.

With certain types of cameras the flashlight and camera becomes easily misaligned due to certain constructural features between the camera and the support bracket by which the flashlight is attached. As a consequence, the pictures resulting from operation of the misaligned camera and flashlight are often faulty.

Accordingly, it is one object of the present invention to provide means for supporting the camera and lamp in proper alignment with respect to each other.

It is another object of this invention to provide a device by which the camera and lamp can not become misaligned.

Finally, it is an object of this invention to provide an improved camera adapter plate which incorporates the foregoing desiderata in an inexpensive manner.

These and other objects apparent to those skilled in the art from the foregoing description and claims may be obtained, the stated result achieved and described difficulties overcome by the discoveries, principles, apparatus, parts, combinations, subcombinations and elements which comprise the present invention, the nature of which is set forth in the following statement, a preferred embodiment of which—illustrative of the best mode in which applicant has contemplated applying the principles—is set forth in the following description, and which is particularly and distinctly pointed out and set forth in the appended claims forming part thereof.

In the accompanying drawings which are illustrative of the preferred embodiment of the invention by way of example, and in which similar numerals refer to similar parts thereof, wherein:

Fig. 1 is a perspective view of a camera having a photographic flashlight attached thereto;

Fig. 2 is an enlarged, fragmentary, side view of the lower portion of the camera, showing the adapter plate in section between the base of the camera and the support platform;

Fig. 3 is a front elevational view of the adapter plate;

Fig. 4 is a perspective view of the adapter plate showing the undersurface thereof; and Fig. 5 is an exploded view showing the undersurface of the camera, the camera support platform, and the adapter plate disposed therebetween.

In Fig. 1 a camera 1 is shown with a photographic flashlight 2. The camera 1 is mounted upon a support platform 3 (Figs. 2 and 5) from which extends on one side thereof a bracket arm 4 on the other end of which is secured the flashlight 2. Between the flashlight and the camera is an electrical cord 5 by which the flashlight 2 and the camera shutter are synchronized when a film exposure is made. The flashlight 2 includes a battery case 6 and a reflector 7 at the center of which is mounted the usual flash bulb 8.

The camera 1 is provided with a number of projections or dowel pins 9 on the undersurface thereof as shown in Fig. 5. In the center of the undersurface of the camera is a threaded aperture 10 by which the camera may be attached to a tripod screw. The aperture 10 is disposed in and reinforced by a circular boss 11 having a transverse portion 12 extending therefrom toward the front of the camera. The dowel pins 9 are preferably symmetrically disposed around the aperture 10 and have a length equal to the thickness of the boss 11 and the portion 12.

The platform 3 (Fig. 5) is rigidly secured to the end of the bracket arm 4 remote from the flashlight 2. The platform is flat and coextensive with the undersurface of the camera 1. In the center of the platform 3 is a slot 13 through which extends a screw 14 having a knurled head 15 (Fig. 2). Ordinarily the camera 1 is attached to the support platform 3 with the screw 14 tightly secured in the threaded aperture 10. When so attached, the extremities of the dowel pins 9 contact the surface of the platform 3, the boss 11 and the portion 12 also contacting the platform 3.

However, the friction created by the dowel pins 9 and the boss 11 and the portion 12 with the platform 3 is not sufficient to hold the camera 1 against rotation about its vertical axis even when the screw 14 is drawn up as tightly as possible. The camera lens 16 becomes misaligned inadvertently with the reflector 7.

To prevent the misalignment an adapter plate 17 may be provided that is detachably mounted on the platform 3. The adapter plate 17 is a preferably rectangular body conforming with the shape of the platform 3. As shown in Fig. 5 the plate 17 includes a horizontal surface portion 18 having a number of dowel holes 19 extending therethrough. The dowel holes 19 are disposed in a manner similar to the dowel pins 9 on the undersurface of the camera 1. In addition, a circular aperture 20 and slot 21 communicating therewith are provided in the surface portion 18 for receiving the boss 11 and transverse portion 12. In addition, the adapter plate 17 includes flanges 22 (Fig. 4) on opposite edges thereof as well as front and rear flanges 23 and 24 on opposite ends. The flanges 23 and 24 include inturned lip portions 25 and 26, respectively. As shown in Figs. 2 and 5 the support platform 3 includes a base plate 27 having front and rear flanges 28 and 29.

The adapter plate 17 may be composed of any suitable material, such as metal, molded plastic, etc. The flanges 23 and 24 on the adapter plate 17 are separable within small limits so that when the plate is attached to the support platform 3, the lips 25 and 26 snap into engagement with the lower edges of the flanges 28 and 29 of the base plate 27. The adapter plate 17, when attached to the platform 3, fits snugly in place with the flanges 22 abutting opposite edges of the platform and with the front and rear flanges 23 and 24 with their lips 25 and 26 snugly engaging the flanges 28 and 29. Thus, rotation of the plate 17 is impossible.

With the adapter plate 17 in place on the platform 3 the camera 1 may be secured by the screw 14 in the usual manner. The surface portion 18 of the plate 17 is disposed in a space between the platform 3 and the camera 1, the dowel pins 9 extending through the dowel holes 19 in the plate. Moreover, the boss 11 and the transverse portion 12 are similarly disposed in the aperture 20 and slot 21, respectively. In this manner the camera 1 is retained against rotation and in alignment with the flashlight 2.

Accordingly, the adapter plate of the present invention prevents misalignment of the camera lens and the photographic flashlight. The adapter plate necessarily holds the camera in proper alignment and there is no possibility that the camera can become misaligned inadvertently at any time through handling on the part of the operator. When attached to the platform, the adapter plate may be easily detached if necessary; but the camera may be detached from the support platform without loosening the adapter plate from its attachment to the platform.

In the foregoing certain terms have been used for brevity, clearness and understanding but no unnecessary limitations are to be implied therefrom beyond the requirements of the prior art, because such words are used for descriptive purposes only and are intended to be broadly construed.

Moreover, the embodiment of the adapter plate construction illustrated and described herein is by way of example and the scope of the present invention is not limited to the exact details of construction shown.

Having now described the features, construction, principles of invention, the characteristics of the adapter plate attachment for a camera and the advantageous, new and useful results provided; the new and useful discoveries, principles, parts, elements, combinations, subcombinations, structures, arrangements and mechanical equivalents obvious to those skilled in the art, are set forth in the appended claims.

I claim:

1. In a camera having a threaded aperture in one outer surface and a plurality of dowel pins symmetrically disposed about the aperture on said surface, a photographic flashlight attachment detachably mounted on the camera, the attachment including a platform having a screw rotatably mounted thereon engageable with the threaded aperture for holding the platform in contact with the ends of the dowel pins and spaced from said outer surface of the camera by a distance equal to the length of the pins, an adapter plate detachably mounted on the platform in the space between said one surface and the platform, the adapter plate having an aperture registrable with the threaded aperture and having other dowel-pin-receiving apertures registrable with the dowel pins on the camera, and the adapter plate having at least one flange abutting one side of the platform, whereby the adapter plate retains the flashlight attachment against rotation with respect to the camera about the screw.

2. In a camera having a threaded aperture in one outer surface and a plurality of dowel pins symmetrically disposed about the aperture on said surface, a photographic flashlight attachment detachably mounted on the camera, the attachment including a platform having a screw rotatably mounted thereon engageable with the threaded aperture for holding the platform in contact with the ends of the dowel pins and spaced from said outer surface of the camera by a distance equal to the length of the pins, an adapter plate detachably mounted on the platform in the space between said one surface and the platform, the adapter plate having apertures registrable with the threaded aperture and the dowel pins on the camera, and the adapter plate being coextensive with the platform and having flanges surrounding all sides of the platform, whereby the adapter plate retains the flashlight attachment against rotation with respect to the camera about the screw.

3. An adapter plate for a camera having a threaded aperture in one outer surface and a plurality of dowel pins symmetrically disposed about the aperture on said surface, a photographic flashlight attachment detachably mounted on the camera, the attachment including a platform having a screw rotatably mounted thereon engageable with the threaded aperture for holding the platform in contact with the ends of the dowel pins and spaced from said outer surface of the camera by a distance equal to the length of the pins, the adapter plate including a plurality of apertures registrable with the threaded aperture and the dowel pins on the camera, the adapter plate being composed of sheet material and detachably mounted on the platform in the space between said one surface and the platform, and the adapter plate being coextensive with the platform and having flanges abutting corresponding sides of the platform, two of said flanges having lip portions engaging the platform on the side remote from the camera, whereby the adapter plate retains the flashlight attachment against rotation with respect to the camera about the screw.

References Cited in the file of this patent

UNITED STATES PATENTS

| | | |
|---|---|---|
| 740,459 | McHaughton | Oct. 6, 1903 |
| 1,357,639 | Kroedel | Nov. 2, 1920 |
| 2,455,365 | Jenner | Dec. 7, 1948 |
| 2,614,471 | Markowitz | Oct. 21, 1952 |
| 2,731,228 | Baldwin et al. | Jan. 17, 1956 |